Figure 1:
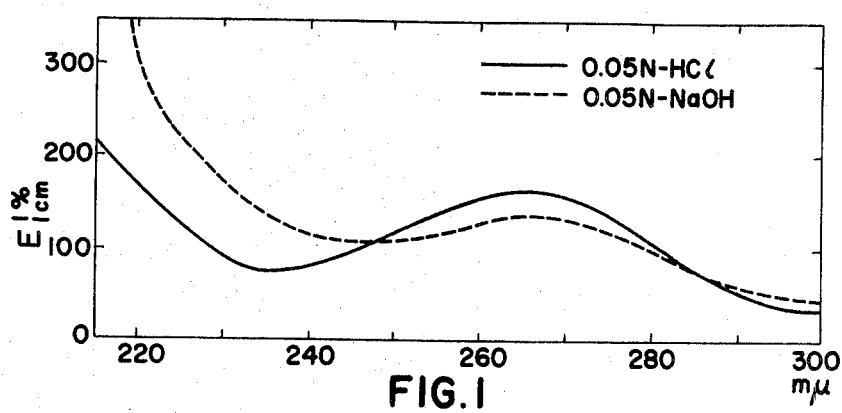

United States Patent

[11] 3,625,940

[72] Inventors Saburo Suzuki;
Kiyoshi Isono; Junsaku Nagatsu, all of Tokyo, Japan
[21] Appl. No. 739,751
[22] Filed June 25, 1968
[45] Patented Dec. 7, 1971
[73] Assignee Rikagaku Kenkyusho, Oaza Shimoniikura Yamato-machi, Kitaadachi-gun, Saitama-ken, Japan
[32] Priority June 30, 1967
[33] Japan
[31] 42/41894

[54] NOVEL ANTIBIOTICS OF AGRICULTURAL FUNGICIDES, POLYOXINS J, K AND L: AND PROCESS FOR PREPARING THE SAME
3 Claims, 6 Drawing Figs.
[52] U.S. Cl..................................................260/211.5 R, 195/80, 424/180
[51] Int. Cl......................................................C07c 47/18

[50] Field of Search........................................... 260/211.5

[56] References Cited
FOREIGN PATENTS
6,512,423  3/1966  Netherlands................. 260/211.5

Primary Examiner—Lewis Gotts
Assistant Examiner—Johnnie R. Brown
Attorneys—Ralph E. Buckham, Jesse D. Reingold, Robert R. Strack and Henry A. Marzullo, Jr.

ABSTRACT: Polyoxins J, K and L are each a novel antibiotic to be used as an agricultural fungicide for the protection of plants.
Said polyoxins J, K and L are recovered from a culture obtained by cultivating in a culture medium *Streptomyces cacaoi* var. *asoensis* that is on deposit with the American Type Culture Collection (ATCC) as ATCC access numbers 19093 and 19094.

SABURO SUZUKI
KIYOSHI ISONO
JUNSAKU NAGATSU
INVENTORS

BY Jesse D. Reingold
THEIR ATTORNEY

NOVEL ANTIBIOTICS OF AGRICULTURAL FUNGICIDES, POLYOXINS J, K AND L: AND PROCESS FOR PREPARING THE SAME

BACKGROUND OF THE INVENTION

This application is related to application Ser. No. 490,001, filed Sept. 24, 1965, now abandoned in favor of the streamlined continuation application, Ser. No. 858,215, filed June 5, 1969, and the continuation-in-part application, Ser. No. 744,455, filed July 12, 1968, which describe the antibiotic polyoxins A and B and the process for their preparation.

The present application is also related to application Ser. No. 643,275, filed June 2, 1967, and its continuation-in-part, Ser. No. 757,010, filed Sept. 3, 1968, which describe the antibiotic polyoxins D, E, F, G and H, and the process of their preparation.

The present invention relates to polyoxins J, K and L which are novel antibiotics and to a process for preparing the same. More particularly, it relates to novel antibiotics which have specific antifungal activity against various kinds of phytopathogenic fungi and which are to be used as agricultural fungicides for the protection of plants. These antibiotics are prepared by collecting the polyoxin complex containing polyoxins J, K and L from a culture obtained by cultivating in a culture medium a novel strain of *Streptomyces cacaoi* var. *asoensis* Nos. 20-52, 20-60 (Type I) or No. 20-60 (Type II) that is a mutant of *Streptomyces cacaoi* belonging to *Streptomyces griseus* group. The novel strains are on unrestricted deposit with the American Type Culture Collection (ATCC) as ATCC access numbers 19093 and 19094, respectively. The collected complex is separated into each of polyoxins J, K and L by distribution chromatography using a solvent system to elute polyoxins J, K and L. This application also relates to a process for their preparation.

The polyoxins A and B are described in Agr. Biol. Chem. Vol. 29, No. 9, pages 848-854, 1965, and polyoxins D, E, F, G and H are described in Agr. Biol. Chem. Vol. 30, No. 8, pages 813-814, and Vol. 31, No. 2, pages 190-197, 1967.

Figure 2:
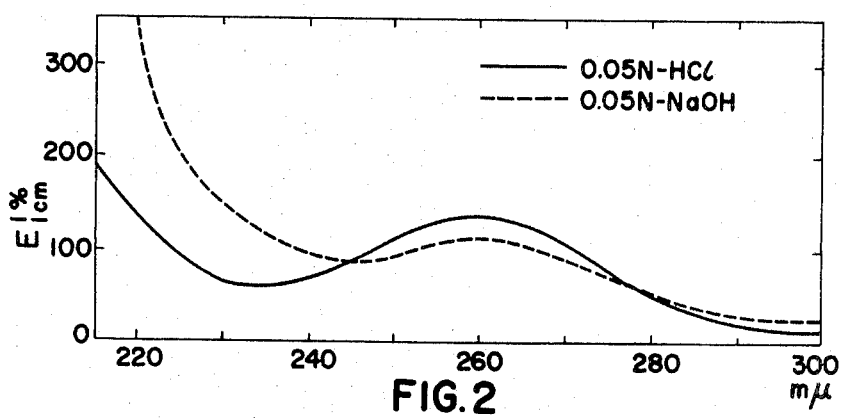
Figure 3:
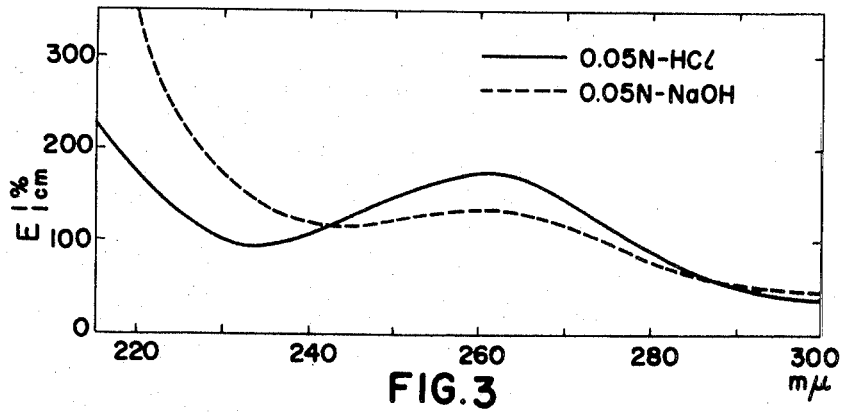
Figure 4:
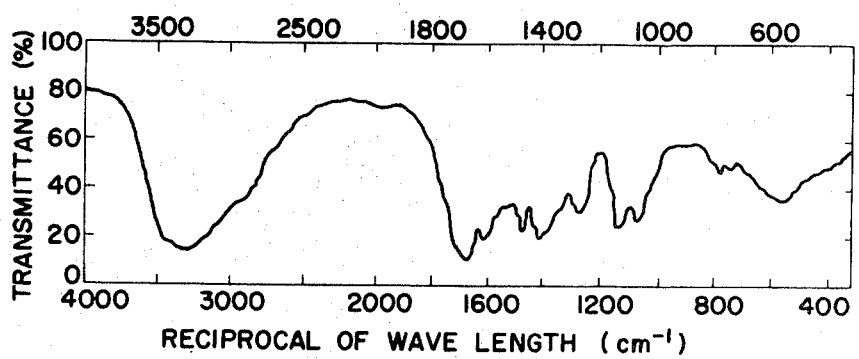
Figure 5:
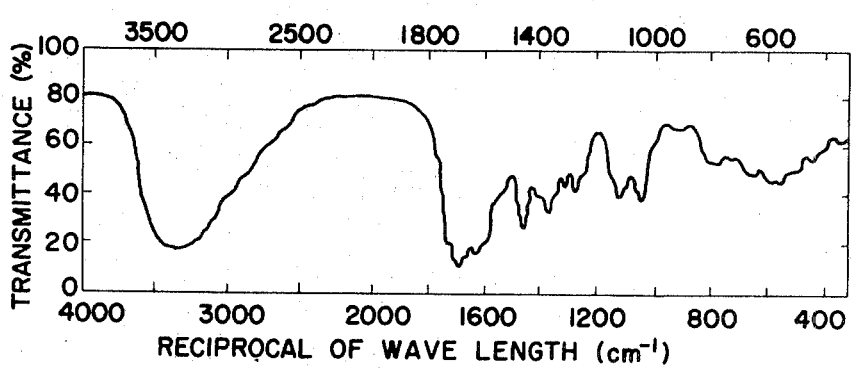
Figure 6:
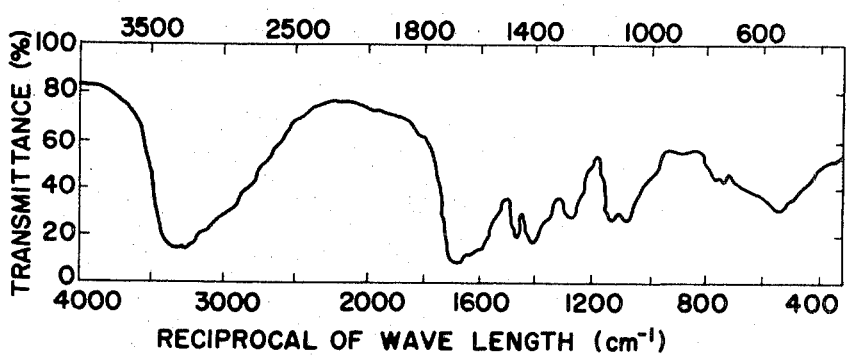

FIGS. 1-3 indicate ultraviolet absorption spectra for polyoxins J, K and L, respectively; and FIGS. 4-6 show infrared absorption spectra for polyoxins J, K and L, respectively.

The novel strains, Nos. 20-52, 20-60 and No. 20-66 which are employed in the process of the invention were isolated from the soil collected in the Bochu Aso district of Kumamoto Prefecture, Japan.

The two strains, Nos. 20-52 and 20-60 have been designated herein as "Type I" and the strain, No. 20-66 has been designated herein as "Type II." Further, the novel strains of Type I and II employed herein have been named "Streptomyces cacaoi var. asoensis."

The strains of *Streptomyces cacaoi* var. *asoensis*, Type I and Type II are substantially identical to each other in morphological characteristics and in the property of utilization of carbon source. However, the strain of *Streptomyces cacaoi* var. *asoensis*, Type II is different in color tone on the reverse of Czapek's agar and shows small differences on other agar preparations as compared with the strain of *Streptomyces cacaoi* var. *asocensis*, Type I.

The strain of *Streptomyces cacaoi* var. *asoensis* is similar to the three species *Streptomyces griseus*, *Streptomyces griseolus* and *Streptomyces cacaoi* among the known strains described in Bergey's Manual of Determination Bacteriology, 7th edition, or in the Actinomycetes, 2nd vol., authored by Waksman. In view of the detailed properties of *Streptomyces cacaoi* var. *asoensis*, it is considered that it belongs to *Streptomyces griseus* group.

When *Streptomyces cacaoi* var. *asoensis*, Type I showing the typical properties of *Streptomyces cacaoi* var. *asoensis* is compared with these species, differences of pigment producibility on Czapek's agar and calcium malate agar as to *Streptomyces griceolus*; differences of color tone of serial mycelia on various agar preparation as to *Streptomyces griceus*; and also the difference that said two species do not form spirals, are noticed which clearly distinguished *Streptomyces cacaoi* var. asoensis from said two strains. The morphological and cultural characteristics of *Streptomyces cacaoi* var. *asoensis* are most closely similar to those of *Streptomyces cacaoi*, although for *Streptomyces cacaoi* the serial mycelia are always white on nutrient agar, yellow pigment is formed on starch agar and no soluble pigment is formed on potato plug and gelatin. Therefore, *Streptomyces cacaoi var. asoensis* appears to belong to the species *Streptomyces cacaoi*, but based on these differences and the characteristic ability of *Streptomyces cacaoi var. asoensis* to produce novel antibiotics, polyoxins J, K and L, it is reasonable to consider it to be a mutant of *Streptomyces cacaoi*. *Streptomyces cacaoi* var. *asoensis*, Type II is naturally also included.

The microbial characteristics of novel strains of *Streptomyces cacaoi* var. *asoensis*, Type I and II which are capable of producing novel antibiotics, polyoxins J, K and L are as follows:

1. Microscopic observation:

Growth was observed to be good at from 20° to 32° C. Aerial mycelia are monopodially branched on synthetic agar and protein-containing agar media. Sporophores from open spirals and no whirls. The shape and size of spores are asymmetrically rodlike ($1.5-1.8\mu \times 0.5-0.7\mu b$), or oval ($1.2-1.0\mu \times 1.0-0.7\mu b$), and the spore surfaces are smooth.

2. Cultural characteristics of *Streptomyces cacaoi* var. *asoensis*:

1. Czapek 'agar (27° C.):

Type I—grows well in colorless or white buff, and forms abundant aerial mycelia which are powdery and changes from white to smoke-grey. The reverse is pale olive-yellow without soluble pigment.

Type II—forms aerial mycelia which are powdery and changes from white to tilleul-buff. The reverse is yellow-tinged with pale pink.

2. Glycerine Czapek's agar (27° C.):

Type I—grows well, pale olive-buff. None or scant, thin white aerial mycelia are formed. The reverse is pale olive-buff or creamy without soluble pigment.

Type II—no aerial mycelia formed, otherwise same as Type I.

3. Nutrient agar (27° C.):

Type I—grows well, wrinkled, smoke-grey, and scant aerial mycelia are formed which change from white to pale grey. The reverse has a slight brown yellow color and produces brown soluble pigment.

Type II—grows same as Type I and forms very scant aerial mycelia which are white to whitish grey. Soluble pigment obtained is less than for Type I.

4. Glucose peptone agar (27° C.):

Type I—grows from creamy to pale greyish-olive. None or scant, whitish grey aerial mycelia are formed. The reverse is pale brown and forms light brown soluble pigment.

Type II—grows scant with slight formation of white or pale grey aerial mycelia in the latter period of culture. The reverse is olive-buff.

5. Glucose asparagine agar (27° C.):

Type I—grows wrinkled and changes from white to cartridge-buff, forming aerial mycelia from white to pale grey or grey in color. The reverse is cartridge-buff and yields no soluble pigment.

Type II—shows very little growth of aerial mycelia, some formation of white grey aerial mycelia occurs.

6. Starch agar (27° C.):

Type I—grows well, colorless or olive-buff and forms abundant powdery, pale mouse-grey aerial mycelia. The reverse is olive-yellow and yields no soluble pigment. Hydrolyzing activity of starch is normal.

Type II—same as Type I.

7. Calcium malate agar (27° C.):

Type I—grows colorless or pale brown and yellow and forms abundant mouse-grey aerial mycelia. Thereverse is creamy yellow and give some formation of light yellow-brown soluble pigment.
Type II—same as Type I.
8. Tyrosine agar (27° C.):
Type I—grows poor, brown color, forms no aerial mycelia. The reverse is creamy color and produces no soluble pigment.
Type II—same as Type I.
9. Egg albumin agar (27° C.):
Type I—grows well, colorless to white and forms substantially no aerial mycelia, but sometimes forms very small white aerial mycelia in the latter period of culture. The reverse is white but yields no soluble pigment.
Type II—same as Type I.
10. Oat meal agar culture medium (27° C.):
Type I—grows olive-buff and forms some pale grey aerial mycelia. Sometimes formation of aerial mycelia does not occur. The reverse is colorless and yields no soluble pigment.
Type II—same as Type I.
11. Potato plug (27° C.):
Type I—grows well, dark-olive and forms pale grey aerial mycelia. The medium changes color to pale smoke-grey.
Type II—same as Type I.
12. Gelatin stab (18° C.):
Type I—grows well and gelatin liquefaction is slight. Dark brown soluble pigment is produced to a small extent.
Type II—gives scarcely any gelatin liquefaction.
13. Glucose broth (27° C.):
Type I—grows well on and under the surface of the solution and produces soluble brown pigment.
Type II—same as Type I.
14. Czapek's solution (27° C.):
Type I—grows well on the surface and at the bottom of the solution and forms thin membranes on the surface together with a little white aerial mycelia. Soluble pigment is not obtained.
Type II—produced no membrane on the surface.
15. Melanin formation:
Both Type I and Type II are negative.
16. Nitrate reduction:
Both Type I and II are slightly positive.
17. Cellulose culture medium:
There is no growth on synthetic culture solution containing cellulose as the sole carbon source.
18. Nutrient (meat, peptone and glucose) agar medium:
Type I—grows good, light olive-buff and wrinkled, and it forms very scant white aerial mycelia or sometimes forms none of them. The reverse of the culture is white in color and Type I produces black soluble pigment in a very small amount.
Type II—grows good, creamy-yellow, without formation of aerial mycelia. The reverse is smooth. Type II is similar to Type I in other respects than described above.
19. Löffler's serum medium (27° C.):
Type I—grows good, olive-yellow and deep wrinkled, and forms no mycelia. It forms black soluble pigment in a small amount.
Type II—same as Type I.
20. Litmus milk (27° C.):
Type I—grows forming brown circle on the surface and does not cause coagulation and peptonization. The pH value is 4.0–5.0 on the 20th day after the start of culture.
Type II—grows in whirls on the surface, and causes gradual coagulation with slight peptonization. The pH value is 7.8–8.0 on the 20th day after the start of culture.
3. Physiological properties:
1. Optimum conditions for growth pH     6–8 (Type I, Type II)
    temperature 25°–30° C. (Type I, Type II)
    very aerobic (Type I, Type II)

2. Critical conditions for possible growth pH's     9 and 4 (Type I)
            10 and 4 (Type II)
    temperature 18° and 37° C. (Type I, Type II)

3. Tyrosinase:
the reaction is weakly positive (Type I, Type II)
4. Peptonization of milk:
Type I, negative.
Type II, positive.
5. Decomposition of cellulose:
Both Type I and Type II, negative
6. Chromogenic function:
weakly positive and occasionally negative
4. Utilization of carbon sources:
The utilization of carbon sources determined according to T. G. Pridham is as follows:

| | Type I | Type II |
|---|---|---|
| Glucose | +++ | +++ |
| Sucrose | +++ | +++ |
| Starch | +++ | +++ |
| Lactose | ++ | +++ |
| Fructose | + | ++ |
| Maltose | +++ | +++ |
| Inulin | +++ | +++ |
| Inositol | ++ | +++ |
| Raffinose | +++ | +++ |
| Arabinose | + | + |
| Galactose | + | ++ |
| Xylose | + | + |
| Mannose | ++ | ++ |
| Rhamnose | +++ | +++ |
| Mannitol | +++ | ++ |
| Salicin | + | + |

+++   good growth
    ++   medium growth
    +   scant growth

According to the process of the present invention, polyoxin complex containing the antibiotics, polyoxins J, K and L can be produced using not only *Streptomyces cacaoi* var. *asoensis* described above, but also polyoxin producing natural and artificial mutants thereof.

In the practice of the present invention, the fermentation may be carried out according to the using fermentation method for common *Streptomyces*. Generally speaking, starch, dextrin, glucose, glycerine, maltose, fructose and the like are used for carbon sources. Meat extracts, peptone, corn-steep liquor, soybean powder, peanut powder, cottonseed powder, yeast and the like are used for nitrogen sources. Inorganic materials, for example, sodium chloride, potassium chloride, calcium carbonate, phosphate and the like may be added to the almost neutral liquid culture medium. The medium is inoculated with the strain of *Streptomyces cacaoi* var. *asoensis* and cultivation is carried out under stirring at a temperature of from 25° to 35° C. In general the concentration of antibiotics produced reaches a maximum after about 40 to 120 hours of cultivation. Since this time of maximum concentration may vary according to the aeration and stirring conditions, even when using the same temperature and the culture medium of the same components, it is advisable to decide said time by determining the potency in each case.

Commonly used physicochemical methods can be employed in order to isolate the antibiotics from the culture broth. For example, at first, the mycelia may be first removed by filtration with the addition of a filter-aid, such as an acid or neutral diatomaceous earth, and the filtrate is then adsorbed on activated carbon at acidic or neutral pH. The antibiotics can be eluted from the activated carbon by a solvent for the antibiotics a mixture of water and watermiscible solvents, for example methanol, ethanol, propanol, butanol, acetone, acetic acid and pyridine. Since polyoxins are amphoteric compounds, they are adsorbed on either cation or anion exchange resins and are eluted by suitable acid, alkali or salt solutions. For example, the culture filtrate, after being made acidic, may be passed through a column containing Dowex 50 WX 8 (H- type) (the word "Dowex" is a trade mark), and the polyoxins that are adsorbed thereon are eluted therefrom by an aqueous solution of 5 percent sodium chloride or phosphate buffer of pH 4.3. The crude powder of polyoxin complex which is thus obtained can be purified by column-chromatographies using an ion-exchanger, such as sulfoethylsephadex (the word "-Sephadex" is a trade mark), sulfoethylcellulose or sulfomethylcellulose, or by a zone electrophoresis technique.

Complete separation of polyoxins J, K and L may be carried out by distribution-chromatography using cellulose powder or silica gel. It may be developed by a suitable solvent i.e., a mixture of water and water miscible solvents, for example methanol, ethanol, propanol, butanol, acetone, acetic acid, pyridine and 75 percent phenol. In this case, polyoxin J, K and L are eluted with other polyoxin components and separated.

By recrystallization from aqueous alcohol, polyoxins J, K and L are each obtained as a colorless powder.

The physico-chemical properties of polyoxins J, K and L are as follows:

1. Decomposition points:
Although the polyoxins J, K and L (referred to hereinafter as J, K and L) show no clear decomposition point, it is evident that each of J, K and L decomposes gradually without melting at temperatures above 200° C.

2. Analytical data of elementary composition:
Each of J, K and L contains the elements carbon, hydrogen, nitrogen and oxygen in the following percentages by weight, the balance being oxygen:

| | | | |
|---|---|---|---|
| J: | C 41.71, | H 5.25, | N 13.90 |
| K: | C 44.25, | H 5.07, | N 13.92 |
| L: | C 40.45, | H 5.09, | N 14.37 |

3. Molecular weights:
As J, K and L are amphoteric compounds, the molecular weights were determined by titration from the equivalent weights thereof, and were found to be:

| J: | 499 |
|---|---|
| K: | 590 |
| L: | 495 |

4. Molecular formulas:

| J: | $C_{17}H_{25}N_5O_{12}$ |
|---|---|
| K: | $C_{22}H_{30}N_6O_{13}$ |
| L: | $C_{16}H_{23}N_5O_{12}$ |

5. Contents of elements calculated from molecular formulas:
J: Calculated for $C_{17}H_{25}N_5O_{12}$ molecular weight 491.41 contents C 41.55, H 5.13 N 14.25.
K: Calculated for $C_{22}H_{30}N_6O_{13}$ molecular weight 586.53 contents C 45.05, H 5.16, N 14.33.
L: Calculated for $C_{16}H_{23}N_5O_{12}$ molecular weight 477.40 contents C 40.26, H 4.86, N 14.67.

6. Chemical structures:
J, K and L have the following chemical structures:

J:

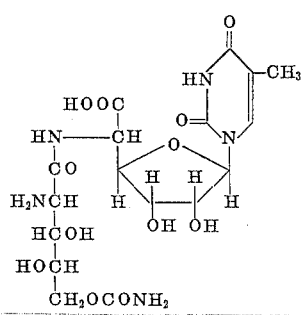

K:

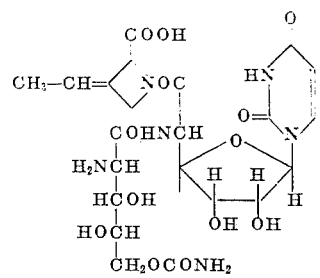

L:

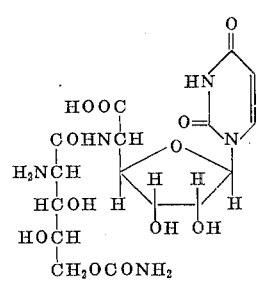

As shown in the above structures, it is noted that J, K and L have the close similarity on their chemical structures.

7. Specific optical rotations:
J: $[\alpha]_D^{22} +31.7°$ (C=1, in water)
K: $[\alpha]_D^{22} -16.5°$ (C=1, in water)
L: $[\alpha]_D^{22} +34.4°$ (C=1, in water)

8. Ultraviolet absorption spectra:
The spectra for J, K and L are shown in FIGS. 1, 2 and 3, respectively. These FIGS. show maxima as follows:
J: $\lambda_{max.}^{0.05N\ HCl} = 264\mu$ ($E_{1cm.}^{1\%} 158$)
$\lambda_{max.}^{0.05N\ NaOH} = 267\mu$ ($E_{1cm.}^{1\%} 133$)
K: $\lambda_{max.}^{0.05N\ HCl} = 259\mu$ ($E_{1cm.}^{1\%} 138$)
$\lambda_{max.}^{0.05N\ NaOH} = 262\mu$ ($E_{1cm.}^{1\%} 109$)
L: $\lambda_{max.}^{0.05N\ HCl} = 259\mu$ ($E_{1cm.}^{1\%} 170$)
$\lambda_{max.}^{0.05N\ NaOH} = 262\mu$ ($E_{1cm.}^{1\%} 132$)

As the result of degradative study, it is clearly shown that the absorption for J is derived from the presence of a chromophore, thymine, in the molecule of J, and that the absorption for K and L are derived from the presence of a chromophore, uracil, in the molecule of K and L.

9. Infrared absorption spectra:
The infrared absorption spectra for J, K and L are shown in FIGS. 4, 5 and 6, respectively, which are measured as potassium bromide tablets. Main absorption occurred at the following wave-lengths.
J: 3300–3400, 1680, 1600, 1475, 1408, 1350, 1278, 1125, 1060, 783, 572 cm.$^{-1}$
K: 3300–3400, 1690, 1640, 1470, 1378, 1315, 1283, 1127, 1058, 780, 565 cm.$^{-1}$
L: 3300–3400, 1670, 1600, 1480, 1412, 1350, 1275, 1120, 1060, 770, 570 cm.$^{-1}$ 10. Rf values:
Rf values determined by developing with the solvent system butanol-acetic acid-water (4:1:2), using the filter paper No. 51 (Toyo Roshi Co.) are as follows:
J: 0.08 K: 0.22 L: 0.08
In this case, the Rf value for polyoxin A as standard is 0.28.

11. Solubilities:
Each of J, K and L is easily soluble in water, but hardly soluble in methanol, ethanol, acetone, chloroform, benzene and ether.

12. Color reactions:
Each of J, K and L gives positive ninhydrin, diazo and Tollens tests but negative Fehling, 2,4-dinitrophenyl hydrazine, Molish, ferric chloride sodium nitroprusside and Sakaguchi tests.

13. Pk's values:
Each of J, K and L is an amphoteric compound, and has three titratable groups. Pk's values thereof are as follows:

J: 3.0, 7.1, 9.9
K: 3.0, 7.2, 9.3
L: 3.0, 7.1, 9.4

14. Stabilities:

Each of J, K and L is somewhat unstable in alkaline solution. but extremely stable in acidic and neutral solutions. No decomposition occurred on heating at 100° C. for 15 minutes in the pH range of 2.0 to 7.0. J, K and L are also stable to ultraviolet light irradiation. Their antifungal activities persists following placing of the solutions 30 cm. from a 20 W. chemical lamp and irradiating for 24 hours.

Summing up, comparison of the physico-chemical properties of polyoxins J, K and L with those of the known antibiotics indicates clearly that the former are novel antibiotics which are different from each of the latter.

The biological activities of polyoxins J, K and L will be hereunder described.

1. Antimicrobial spectra:

The following table shows the antimicrobial spectrum of polyoxins J, K and L in minimal inhibitory concentration for phytopathogenes. The minimal inhibitory concentration was determined 48 hours after incubation using a potato-sucrose agar medium and test organisms listed in the following table.

As shown in the table, both polyoxins J, K and L are characterized in that they have very specific high activities against various phytopathogenes, for example *Alternaria kikuchiana*, *Cochliobolus miyabeanus*, *Piricularia oryzae* and *Guignardia laricina*, but are hardly active against other fungi, such as *Trichopyton*, *Candida*, *Cryptococcus*, *Aspergillus* and *Mucor*, and also inactive against all kinds of bacteria tested.

TABLE

Antimicrobial Spectrum of Polyoxins J, K and L.

| Test organism | Minimal inhibitory concentration ($\mu$g./ml.) | | |
|---|---|---|---|
| | J | K | L |
| Alternaria kikuchiana | 50 | 25 | 12.5 |
| Cochliobolus miyabeanus | 6.25 | 3.12 | 6.25 |
| Pellicularia sasakii | 100 | 100 | 100 |
| Piricularia oryzae | 12.5 | 1.56 | 6.25 |
| Guignardia laricina | 1.56 | 1.56 | 1.56 |
| Corticium rolfsii | 100 | 12.5 | 100 |
| Sclerotinia cinerea | 6.25 | 1.56 | 3.12 |
| Cladosporium fulvum | 12.5 | 50 | 100 |
| Helminthosporium sigmoideum | 6.25 | 25 | 3.12 |
| Trichophyton asteroides | >50 | >50 | >50 |
| Trichophyton interdigitalis | >50 | >50 | >50 |
| Trichophyton rubrum | >50 | >50 | >50 |
| Candida albicans | >50 | >50 | >50 |
| Candida tropicalis | >50 | >50 | >50 |
| Candida crusei | >50 | >50 | >50 |
| Cryptococcus neoformans | >50 | >50 | >50 |
| Aspergillus fumigatus | >50 | >50 | >50 |
| Aspergillus terreus | >50 | >50 | >50 |
| Mucor racemosus | >50 | >50 | >50 |
| Nocardis asteroides | >50 | >50 | >50 |
| Trichomonas vaginalis | >50 | >50 | >50 |
| Staphylococcus aureus 209 p | >50 | >50 | >50 |
| Micrococcus luteus | >50 | >50 | >50 |
| Bacillus subtilis | >50 | >50 | >50 |
| Mycobacterium smegmatis | >50 | >50 | >50 |
| Mycobacterium 607 | >50 | >50 | >50 |
| Mycobacterium phlei | >50 | >50 | >50 |
| Mycobacterium BCG | >50 | >50 | >50 |
| Escherichia coli | >50 | >50 | >50 |
| Pseudomonas aeruginosa | >50 | >50 | >50 |
| Serratia marscens | >50 | >50 | >50 |
| Proteus vulgaris | >50 | >50 | >50 |
| Xanthomonas oryzae | >50 | >50 | >50 |

2. Usage and efficacy:

1. Usage:

For commercial use as an agricultural chemical, polyoxins J, K and L can be prepared as a dust preparation, an emulsifiable concentrate or a wettable powder, each containing the active polyoxins J, K and/or L, according to conventional procedures. For example, said polyoxins can be admixed with solid or liquid carriers, such as talc, clay, silica, water, methanol, ethanol, acetone, dimethylformaldehyde and ethyleneglycol.

In addition, said polyoxins can be mixed with adjuvants generally used for agricultural chemicals. The adjuvants may be mixed with said polyoxins in wide range of forms, such as in the form of emulsifier, dispersant or spreader. For example, such adjuvants are nonionic, anionic and cationic surface active agents, such as polyoxyethylene, alkyl allylether, alkyl allyl polyethyleneglycolether, alkyl allyl sorbitan monolaurate, alkyl allyl sulfonate, alcoholic ester of sulfate and alkyl dimethyl benzyl ammoniumhalide, and formalin condensates of lignin-sulfonate and dinaphthylmethane disulfonate, and stearates, polyvinylalcohol, carboxymethyl cellulose and gum arabic.

The preparations of said polyoxin dust, emulsifiable concentrate and wettable power will be described in examples 4 to 7.

The polyoxin dust preparation, emulsifiable concentrate and wettable powder are each applied to plants in a form as it is, or in a liquid form diluted with water under agitation according to the desired concentration.

2. Efficacy:

i. In pot tests to prevent infestation of brown spot of riceplants (*Cochliobolus miyabeanus*) and to prevent spread of the disease spots, polyoxins J, K and L showed superior effects. One of the test results will be hereunder described.

Method:

Spraying the fixed concentration of test chemical solution on rice plants (in pot, species: *Jikkoku*), test plants were put in the open air for 1 hour, and then spore suspension of test fungus was inoculated by sprayer. After this, they were kept inside green house, and after 3 days, number of disease spot was checked. (three pots per plot)

Test results:

| Test chemical | Concentration (p.p.m.) | Average number of disease spots per leaf | Preventive value |
|---|---|---|---|
| Polyoxin J | 100 | 3.5 | 89.2 |
| Polyoxin K | 100 | 3.4 | 89.5 |
| Polyoxin L | 100 | 4.6 | 85.8 |
| Triazin* | 500 | 1.3 | 95.9 |
| Control | — | 32.5 | — |

*Marketing product ii. In a pot test to prevent infestation of black spot on pear (*Alternaria kikuchiana*), polyoxin J, K or L showed high control efficacy.

The test results were as follows:

Method:

Two pear trees (species: *Pyrus aromatica Kikuehi* et *Nakai*) per plot were selected for testing and fixed concentration of test chemical was sprayed. After drying in the air, spore suspension of Black spot was inoculated by sprayer. After inoculation, treated plants were put into bell jar and kept temperature at 28° C. After 4 days, eleven leaves per tree were checked on the occurrence of disease by the following 5 grades of index.

| Index of occurrence of disease | 0 | Infested area 0 of leaf |
|---|---|---|
| Index of occurrence of disease | 1 | Infested area 0–20% of leaf |
| Index of occurrence of disease | 2 | Infested area 20–40% of leaf |
| Index of occurrence of disease | 3 | Infested area 40–60% of leaf |
| Index of occurrence of disease | 4 | Infested area 60–80% of leaf |
| Index of occurrence of disease | 5 | Infested area 80–100% of leaf |

Test results:

| Test chemical | Concentration (p.p.m.) | Average infected index per leaf | Preventive value |
| --- | --- | --- | --- |
| Polyoxin J | 100 | 0.9 | 78.6 |
|  | 50 |  |  |
| Polyoxin K | 100 | 1.2 | 71.4 |
|  | 50 |  |  |
| Polyoxin L | 100 | 1.1 | 73.8 |
|  | 50 |  |  |
| Aateck* | × 1,000 | 1.8 | 57.2 |
| Difoltan* | × 1,000 | 0.9 | 78.6 |
| Control |  | 4.2 | 0 |

*Marketing product

Based on these data, field trials to control the diseases of plants were carried out.

Each of polyoxins J, K and L showed high control efficacy against diseases caused by various phytopathogens, such as *Cochliobolus miyabeanus*, *Alternaria kikuchiana* and *Alternaria mali*.

The results of field trials of polyoxins J, K and L against black spot disease on pear and *Alternaria* leaf spot disease on applied showed that several applications of polyoxin wettable powder containing each of polyoxins J, K and L had effectively controlled these diseases as shown in examples 8 and 9.

As described in the above tests, it is noted that each of polyoxin preparations is fully useful for immediate commercial use as an agricultural fungicide.

Besides the above-mentioned diseases, polyoxins J, K and L have great promise to be used commercially as agricultural fungicides having high control efficacy against diseases caused by other phytopathogens, such as leaf mold of tomato *Cladosporium fulvum*), shoot blight of Japanese larch (*Guignardia laricina*) and brown spot of peach (*Sclerotinia cinerea*).

3. Phytotoxicity and toxicity:

A. Phytotoxicity:

In phytotoxicity tests on rice-plants and various crops polyoxins J, K and L were nonphytotoxic when used as foliar sprays of concentration of 200 p.p.m. or more. Namely, no phytotoxic signs were noticed even in sprays of concentration of 800 p.p.m. on rice-plants, and sprays of concentration of 200 p.p.m. on most other crops, such as apple, pear and tomato.

B. Toxicity:

1. In toxicity tests with mice polyoxins J, K and L were nontoxic in intravenous injection of 500 mg./kg. or oral administration of 15 g./kg.
2. In toxicity tests with rabbits solution of 400 mg./ml. produced no irritation when instilled into the conjunctival sac of rabbits.
3. No dermal toxicity was detected.
4. In toxicity tests with fish both polyoxins J, K and L at the concentration of 10 p.p.m. were nontoxic during 75 hours period of exposure.

Summing up, it is noted that polyoxins J, K and L are novel antibiotics having superior preventive and curative actions and efficacy against various diseases caused by phytopathogens without producing phytotoxicity and toxicity, and said antibiotics are extremely useful for agricultural fungicides for the protection of plants on the practical use. For example, the polyoxins J, K and L can be used as a dust, an emulsifiable concentrate or a wettable powder containing J, K and/or L, according to conventional procedures. The polyoxins J, K and/or L can be mixed with solid or liquid carriers. The dust, emulsifiable concentrate or wettable powder can be applied as is, or in liquid form diluted with water.

SUMMARY OF THE INVENTION

Polyoxins J, K and L are each an antibiotic which is prepared by cultivating novel strains of *Streptomyces cacaoi* var. *asoensis* (ATCC access numbers 19093 (Type I) and 19094 (Type II) in a culture medium and then separating polyoxin complex containing said polyoxins J, K and L produced from the culture medium into each of polyoxins J, K and L.

Based on the physico-chemical and biological properties, especially the chemical structure and the efficacy of said antibiotic, it is noted that said antibiotic, as compared with the known antibiotics, is a novel one.

Said antibiotic can be easily prepared to the preparation as used for an agricultural fungicide.

Carrying out pot tests and field trials, superior results were obtained for the preparation of said antibiotic to be extremely useful for an agricultural fungicide for the protection of plants on the practical use without producing phytotoxicity and toxicity.

Furthermore, it is of great promise to be used commercially as an agricultural fungicide having high control efficacy against other various phytopathogens.

In addition, it is noted that applications of said preparation show a tendency to increase yields of crops.

Examples of the present invention are shown hereinafter.

EXAMPLE 1 a. Fermentation procedure

A culture medium was prepared having the following composition:

| | |
| --- | --- |
| glucose | 15 g. |
| starch | 50 g. |
| soybean meal | 20 g. |
| ammonium sulfate | 5 g. |
| dried yeast | 10 g. |
| sodium chloride | 5 g. |
| calcium carbonate | 2 g. |
| water | 1000 ml. |

The pH of the medium was adjusted to 7.6, and sterilization was carried out at a temperature of 120° C. for 20 minutes.

The strain of *Streptomyces cacaoi* var. *asoensis* (Type I, ATCC 19093) was inoculated into the culture medium and fermented therein at a temperature of 27° C. under stirring which was maintained until maximum potency was obtained. Assay was made using Alternaria kikuehiana and Cochliobolus miyabeanus as test organisms. When the strain of *Streptomyces cacaoi* var. *asoensis* Type I was shaken-cultured in 300 ml. Erlenmeyer's flask containing 70 ml. of the medium, the potency reached a level after 72–96 hours. When the 48 hours shaken-cultured broth was inoculated into a fermentation tank containing 400 liters of the same medium and the fermentation was carried out under agitation at a rate of 220 r.p.m. and aeration at a rate of 400 liters per minute, the production of the antibiotic reached a maximum (1.8 mg./ml.) after about 96–120 hours fermentation.

b. Isolation and purification 430 liters of the fermented broth was acidified to a pH of 2.0 with 10 percent hydrochloric acid and then heated up to 70° C. and added to 9 kg. of diatomaceous earth, followed by filtering in a filter press. The filtrate was treated with 8 kg. of activated carbon and 8 kg. of diatomaceous earth, stirred and filtered. The activated carbon was washed with 350 liters of water. The active principles were then eluted twice with 100 liters of 60 percent aqueous acetone. The eluted solution was concentrated in vacuo. Thus, 4 liters of liquid containing the desired products were obtained.

50 liters of acetone were added to the liquid and the resultant precipitate was dried under reduced pressure to obtain 920 g. of brown crude powder. 300 g. of this powder were dissolved in water and acidified to a pH of 2.0. The acidified solution was passed through a column packed with 4.5 liters of Dowex 50 WX8 (50–100 mesh, H-form). After washing with water, the antibiotics were eluted with a 5 percent aqueous sodium chloride solution. The active eluates were collected and treated with carbon to remove inorganic salts. After the concentration of eluates from the carbon treatment 60 g. of pale brown powder was obtained.

This powder was chromatographed again on Dowex 50 WX8. This power was dissolved in 0.1 M. phosphate buffer of pH 2.0 and adsorbed on a column packed with 2 liters of Dowex 50 WX8 (100–200 mesh) which was buffered with phosphate buffer of pH 2.0. The antibiotics were eluted with 0.1 M. phosphate buffer of pH 4.3. Active eluates were treated with carbon as described above to remove inorganic salts: resulting in a yield of 35 g. of pale yellow powder. This was further purified by chromatography using sulfoethysephadex which is a strongly acidic exchange resin of a sulfoethyl type. Namely, this power was applied to the 50 g. column of sulfoethylsephadex (SE–C–25) previously buffered with 0.01 M. phosphate buffer (pH 2.0). By successively increasing the concentration of the buffer up to 0.1 M. the antibiotics were eluted. Thus, 18 g. of the purified white powder of polyoxin complex were obtained.

c. Separation of polyoxins J, K and L

The resulting polyoxin complex was dissolved in water, and the resulting solution was passed through a column packed with 500 liters of Amberlite IR–4B–Cl type (100–200 mesh).

The effluent thereof was combined with the water washings. The resulting solution was concentrated under reduced pressure to yield 10 g. of white powder which was a mixture of polyoxins A, B, G, H, J, K and L. (In this case, polyoxins D, E and F are adsorbed on the resin.)

Further, cellulose column chromatography was carried out in order to separate polyoxins J, K and L in a pure state. Namely, distribution chromatography on a cellulose column (55×1,000 mm.) was carried out using the solvent system of butanol - acetic acid - water (ratio by volume of 4:1:2). At first, polyoxin H was eluted, then followed by polyoxins K, A, J, G, L and B.

When they were not fully separated, cellulose column chromatography was carried out again using 75 percent phenol as a solvent in order to separate polyoxins J, K and L completely.

0.1 g. of polyoxin J, 0.06 g. of polyoxin K and 0.08 g. of polyoxin L were thus obtained from 10 g. of polyoxin complex.

Finally, the crystallization was carried out from aqueous ethanol. Polyoxins J, K and L were obtained as colorless powders.

EXAMPLE 2

A culture medium was prepared having the following composition:

| | |
|---|---|
| sucrose | 60 g. |
| glucose | 15 g. |
| dried yeast | 35 g. |
| soybean meal | 15 g. |
| potassium phosphate | 2 g. |
| calcium carbonate | 4 g. |
| water | 1000 ml. |

The pH value of the medium was not further adjusted and fermentation was carried out following a similar procedure to that employed in example 1. The concentration of polyoxin reached 3 mg./ml. from 72 to 96 hours after inoculation with *Streptomyces cacaoi* var. *asoensis* Type I.

The polyoxins J, K and L were separated from the culture medium by a similar procedure to that described in example 1.

Yield: polyoxin J 0.5 g., polyoxin K 0.3 and polyoxin L 0.4 g. from 28 g. of polyoxin complex.

EXAMPLE 3

A culture medium was prepared having the following composition:

| | |
|---|---|
| soluble starch | 70 g. |
| glucose | 5 g. |
| soybean meal | 15 g. |
| sodium chloride | 2 g. |
| calcium carbonate | 4 g. |
| water | 1000 ml. |

The pH of the medium was adjusted to 7.0 and fermentation was carried out employing a similar procedure to that employed in example 1, except for the inoculation of *Streptomyces cacaoi* var. *asoensis* Type II (ATCC 19094) instead of Type I.

The concentration of polyoxin reached 7 mg./ml. from 72 to 96 hours after inoculation of the medium with *Streptomyces cacaoi* var. *asoensis* Type 11.

The polyoxins J, K and L were separated from the culture medium by a similar procedure to that described in example 1.

Yield: polyoxin J 1.2 g., polyoxin K 0.65 g. and polyoxin L 0.8 g. from 62 g. of polyoxin complex.

In examples 4–7, the references to "parts" are to parts by weight.

EXAMPLE 4

Dust Preparation 0.2 parts polyoxin J (or L or complex), 0.5 parts calcium stearate, 50 parts talc and 49.3 parts clay were mixed and crushed.

The preparation is a white powder.

The polyoxin dust obtained was scattered on plants at a rate of 2 to 5 kg./10 are.

EXAMPLE 5

Emulsifiable Concentrate

Five parts of polyoxin J, 3 parts polyoxin B, 10 parts alkyl dimethyl benzyl ammonium chloride and 52 parts methanol were mixed and dissolved.

The preparation is pale yellow in color.

The polyoxin emulsifiable concentrate obtained was diluted with water under agitation within the range of 10 to 200 p.p.m. and sprayed on plants.

EXAMPLE 6

Wettable Powder

Five parts polyoxin L, 10 parts ethyleneglycol, 30 parts methanol, 5 parts polyoxyethylene alkyl allyl ether and 50 parts water were mixed and dissolved.

The preparation is a white powder and easily soluble in water.

The polyoxin wettable powder obtained was diluted with water under agitation within the range of 10 to 200 p.p.m. and sprayed on plants.

EXAMPLE 7

Wettable Powder

Ten parts polyoxin K (or J or complex), 5 parts sulfuric sodium laurate, 2 parts formalin condensate of dinaphthylmethane disulfonate and 83 parts clay were mixed and crushed.

The preparation is a white powder and easily soluble in water.

The polyoxin wettable powder obtained was diluted with water under agitation within the range of 10 to 200 p.p.m. and sprayed on plants.

EXAMPLE 8

The results of field trials of polyoxin wettable powder containing each of polyoxin J, K and L against black spot disease on pear were as follows:

| Treatment | Concentration (p.p.m.) | % of infected leaves | Preventive value | Phytotoxicity |
|---|---|---|---|---|
| Polyoxin J (w.p.)[a] | 100 | 10 | 90 | — |
| Polyoxin K (w.p.) | 100 | 15 | 85 | — |
| Polyoxin L (w.p.) | 100 | 7 | 93 | — |
| Control | — | 100 | 0 | |

Sprays: 8 times each 10 days

[a] "w.p." means "wettable powder"

EXAMPLE 9

The results of field trials of polyoxin wettable powder containing each of polyoxins J, K and L against Alternaria leaf spot disease on apple were as follows:

| Treatment | Concentration (p.p.m.) | Number of disease spot per leaf | Preventive value | Ratio of disease spot area | Phytotoxicity |
|---|---|---|---|---|---|
| Polyoxin J (w.p.) | 100 | 2.5 | 97.5 | 0 | — |
|  | 50 | 5.8 | 94.2 | 0.5 | — |
| Polyoxin K (w.p.) | 100 | 8.5 | 91.6 | 1 | — |
|  | 50 | 12.1 | 87.9 | 0.5 | — |
| Polyoxin L (w.p.) | 100 | 2.1 | 97.9 | 0 | — |
|  | 50 | 5.4 | 94.6 | 0 | — |

Sprays: 8 times each 10 days

We claim:

1. The antibiotic, polyoxin J having the structure:

J:

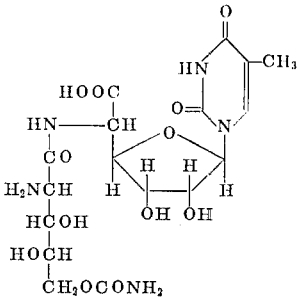

2. The antibiotic, polyoxin K having the structure:

K:

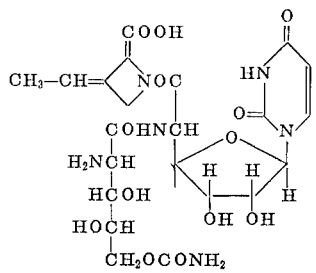

3. The antibiotic, polyoxin L having the structure:

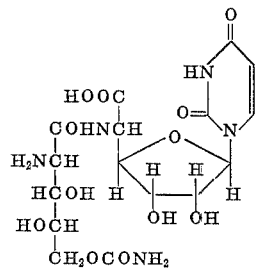

* * * * *